(12) United States Patent
Goss

(10) Patent No.: US 8,364,886 B2
(45) Date of Patent: Jan. 29, 2013

(54) VERIFYING WHETHER METADATA IDENTIFIES A MOST CURRENT VERSION OF STORED DATA IN A MEMORY SPACE

(75) Inventor: Ryan James Goss, Lakeville, MN (US)

(73) Assignee: Seagate Technology LLC, Scotts Valley, CA (US)

( * ) Notice: Subject to any disclaimer, the term of this patent is extended or adjusted under 35 U.S.C. 154(b) by 366 days.

(21) Appl. No.: 12/693,691

(22) Filed: Jan. 26, 2010

(65) Prior Publication Data

US 2011/0185112 A1    Jul. 28, 2011

(51) Int. Cl.
    *G06F 12/16* (2006.01)
(52) U.S. Cl. . 711/103; 711/156; 711/170; 711/E12.008; 711/E12.103
(58) Field of Classification Search .................. None
    See application file for complete search history.

(56) References Cited

U.S. PATENT DOCUMENTS

| | | | |
|---|---|---|---|
| 5,761,677 A * | 6/1998 | Senator et al. ...................... 1/1 |
| 7,360,039 B2 * | 4/2008 | De Jong et al. ............... 711/156 |
| 8,255,617 B2 * | 8/2012 | Goss et al. .................... 711/103 |
| 2003/0078930 A1 | 4/2003 | Surcouf et al. |
| 2005/0198079 A1 | 9/2005 | Heeb |
| 2005/0198088 A1 | 9/2005 | Subramoney et al. |
| 2006/0161737 A1 | 7/2006 | Martin et al. |
| 2006/0248130 A1 | 11/2006 | Grarup et al. |
| 2006/0271725 A1 * | 11/2006 | Wong ............................ 711/103 |
| 2008/0229139 A1 | 9/2008 | Moir et al. |
| 2009/0150599 A1 * | 6/2009 | Bennett ......................... 711/103 |
| 2009/0157989 A1 * | 6/2009 | Karamcheti et al. .......... 711/156 |
| 2009/0259919 A1 * | 10/2009 | Kilzer et al. .................... 714/773 |
| 2010/0169710 A1 * | 7/2010 | Royer et al. ..................... 714/22 |
| 2010/0235565 A1 * | 9/2010 | Ton-That et al. ............. 711/103 |
| 2011/0035540 A1 * | 2/2011 | Fitzgerald et al. ............. 711/103 |
| 2011/0231713 A1 * | 9/2011 | Takada et al. .................. 714/54 |

OTHER PUBLICATIONS

Jesung Kim; Jong Min Kim; Noh, S.H.; Sang Lyul Min; Yookun Cho; , "A space-efficient flash translation layer for CompactFlash systems ," Consumer Electronics, IEEE Transactions on , vol. 48, No. 2, pp. 366-375, May 2002.*

* cited by examiner

*Primary Examiner* — Edward Dudek, Jr.
*Assistant Examiner* — Ralph A Verderamo, III
(74) *Attorney, Agent, or Firm* — Hall Estill, et al.

(57) ABSTRACT

Method and apparatus for verifying whether metadata identifies a most current version of data stored in a memory space. In accordance with various embodiments, a physical location within a first portion of a solid-state memory space is identified by metadata as storing a current version of user data having a selected logical address. A reverse search is performed upon a second portion of the memory space to determine whether the physical address identified by the metadata stores a stale version of the user data, or whether the physical address stores the current version.

19 Claims, 7 Drawing Sheets

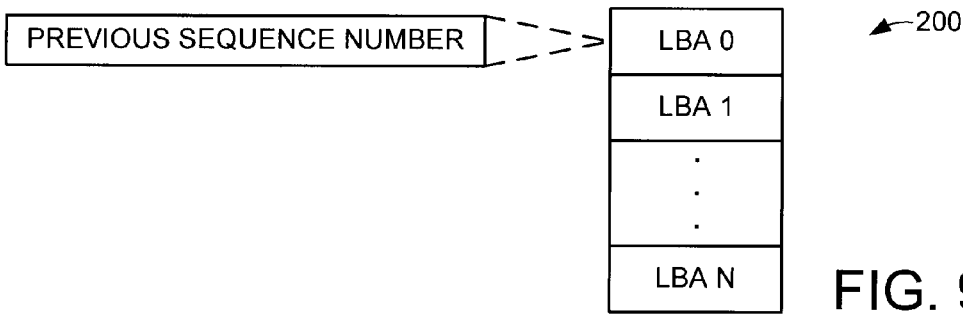
FIG. 9
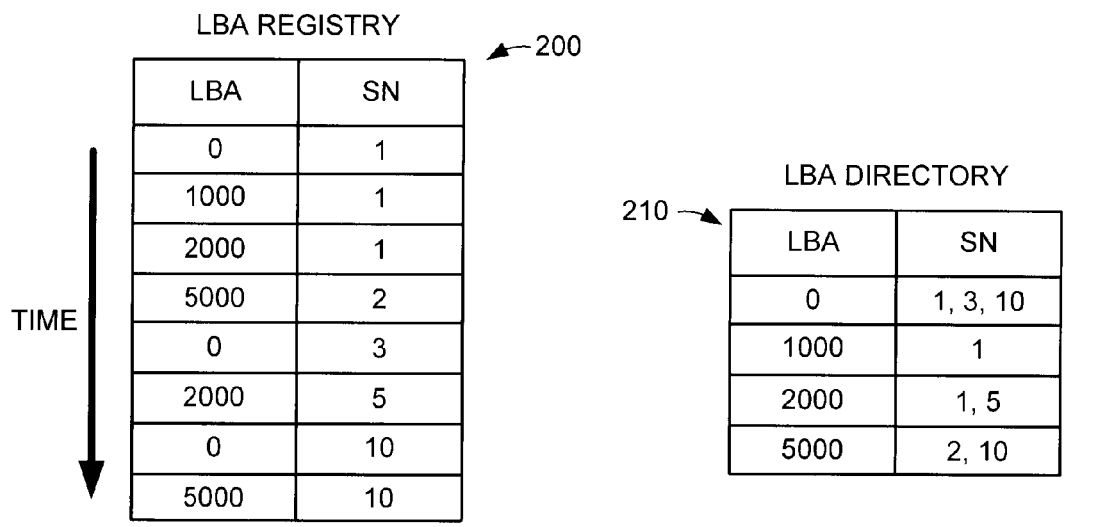
FIG. 10
FIG. 11
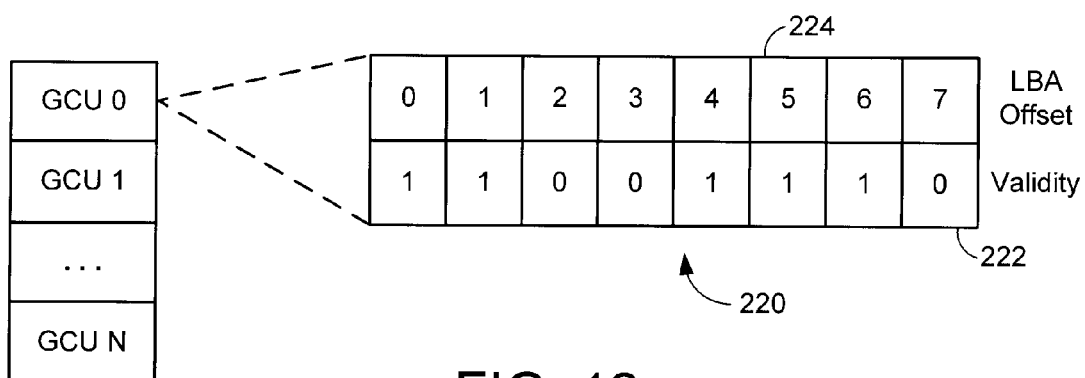
FIG. 12

VERIFYING WHETHER METADATA IDENTIFIES A MOST CURRENT VERSION OF STORED DATA IN A MEMORY SPACE

SUMMARY

Various embodiments of the present invention are generally directed to a method and apparatus for verifying whether metadata identifies a most current version of data stored in a memory space.

In accordance with various embodiments, a physical location within a first portion of a solid-state memory space is identified by metadata as storing a current version of user data with a selected logical address. A reverse search is performed upon a second portion of the memory space to determine whether the physical address identified by the metadata stores a stale version of the user data, or whether the physical address stores the current version.

These and other features and aspects which characterize various embodiments of the present invention can be understood in view of the following detailed discussion and the accompanying drawings.

BRIEF DESCRIPTION OF THE DRAWINGS

FIG. 9 provides a format for an LBA registry table in accordance with some embodiments.

FIG. 10 shows an exemplary format of the LBA registry table of FIG. 9.

FIG. 11 illustrates an LBA directory table format.

FIG. 12 provides a bitmask format.

DETAILED DESCRIPTION

Figure 1:
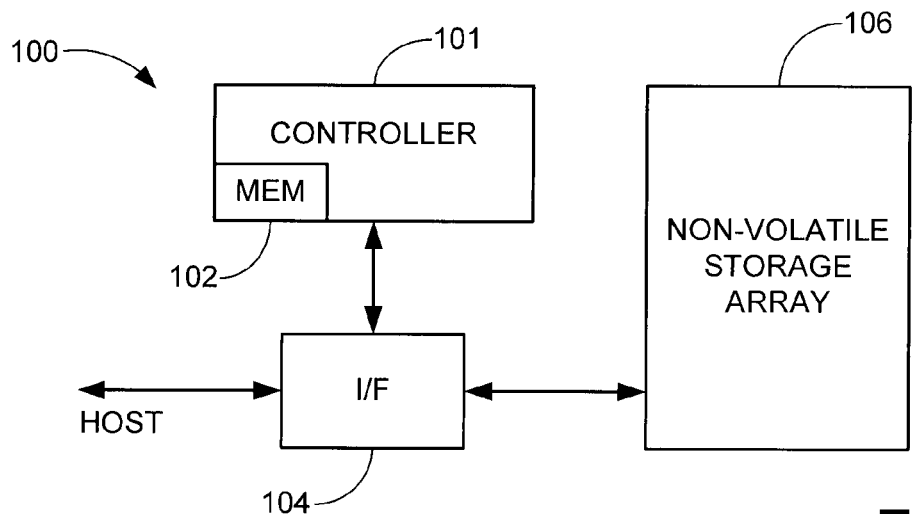
FIG. 1 provides a functional block representation of a data storage device.

The present disclosure relates to data handling systems, and in particular to methods and devices that verify whether metadata identify a most current version of user data stored in a memory space.

Data storage devices generally operate to store blocks of data in memory. The devices can employ data management systems to track the physical locations of the blocks so that the blocks can be subsequently retrieved responsive to a read request for the stored data. Some types of data storage devices, such as solid state drives (SSDs), can be arranged to write data to a new available location each time a block is presented for writing. Over time, a situation may arise where several versions of a given block may persist in memory, with one of the versions being the most current data and the remaining versions being older, stale data.

Metadata can be generated and maintained to track the locations and status of the stored data. Such metadata tracks the relationship between logical elements (such as logical block addresses, LBAs, objects, system data, and other metadata) stored in the memory space and physical locations (such as physical block addresses, PBAs) of the memory space.

Data management systems often expend considerable effort in maintaining the metadata in an up-to-date and accurate condition, since the metadata are used to retrieve data responsive to host data requests. Metadata failures can occur from time to time due to a variety of factors, including loss or corruption of the stored metadata, failures in the circuitry used to access the metadata, incomplete updates of the metadata during a power failure, etc. In some cases, a metadata failure may result in an older version of data being returned to the host. In other cases, the failure may render the entire device unusable.

In accordance with exemplary embodiments, the integrity of a memory space can be improved by storing and maintaining metadata to provide logical-to-physical locality information, as well as separate descriptor data that allows verification of the metadata and, if necessary, reconstruction of the metadata in the event of a failure condition.

The descriptor data enable identification of a sequence in which different portions of the memory, referred to as garbage collection units (GCUs), are allocated for service. During a read operation, the metadata can be used to identify a physical address of a most current version of the requested data, and the descriptor data can be concurrently used to verify the integrity of the metadata.

A reverse search can be carried out on the GCU having the highest sequence number and having a version of the requested LBA. Since LBAs are stored in time order, the first version of the LBA encountered during the reverse search will be the most current version. If the metadata does not point to this most current version, a failure in the metadata can be declared and a rebuild operation can be scheduled. In an exemplary operation, a search can be started from a location designated by metadata that searches forward in sequence to attempt to find a newer GCU with the LBA, consequently triggering a metadata failure.

In some embodiments, a separate storage array table is generated on a per GCU and per LBA basis, facilitating the reverse search to locate the most current version of the LBA. In further embodiments, a bitmask is generated with indicator bits that indicate whether each version of each LBA is the most current version or is an older, stale version.

FIG. 1 shows an exemplary data storage device 100. While not limiting, for purposes of the present discussion the device 100 will be characterized as a solid-state drive (SSD) that utilizes Flash memory to provide non-volatile memory storage.

The device 100 includes a top level controller 102, an interface (I/F) circuit 104 and a non-volatile data storage array 106. The I/F circuit 104 operates under the direction of the controller 102 to transfer user data between the array 106 and a host device (not shown). In some embodiments, the controller 102 is a programmable microcontroller. Data can be buffered in the I/F circuit 104 pending a transfer of the data between the array 106 and the host device. The array 106 can be arranged as one or more planes, layers, chips, etc.

Figure 2:
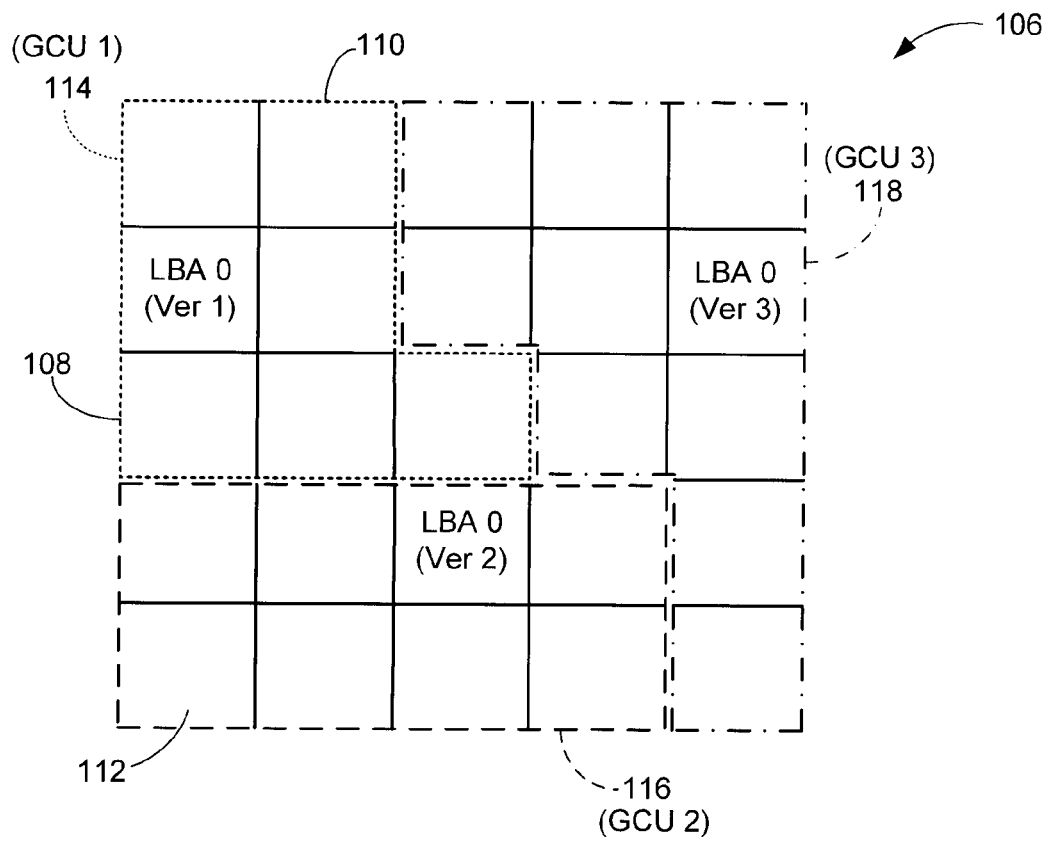
FIG. 2 depicts the memory array of the device of FIG. 1 arranged into a plurality of garbage collection units (GCUs).

FIG. 2 provides a functional representation of portions of the non-volatile storage array 106 of FIG. 1. Non-volatile memory cells are arranged in rows 108 and columns 110 to define a number of fixed sized memory blocks 112. Each block incorporates multiple pages (e.g., rows) of memory, with each page sharing a common source control line. An exemplary block size is 128 pages of memory with each page providing 4096 bytes (4 KB) of storage. Other block sizes can be used.

The blocks 112 may be erasure blocks, that is, the smallest increment of memory subjected to an erase operation at a given time. Each column 110 in FIG. 2 may represent a different plane, chip, memory layer, etc. so logical proximity in FIG. 2A does not necessarily imply physical proximity.

In some embodiments, data are supplied from the host in fixed size sectors, such as 512 bytes. Each sector may have an associated logical block address (LBA) which allows unique identification of the block at the host level. The blocks of data are stored at an associated physical block address (PBA) in the array. Due to a variety of factors including data compression, encoding, encryption, etc., the actual number of bits stored in the associated PBA in the array may vary from one block (LBA) to the next. Metadata are generated and stored to provide the requisite logical-to-physical locality to convert LBA information to the associated PBA information for each LBA stored by the array.

The blocks 112 can be arranged into a number of manageable regions referred to as garbage collection units (GCUs). The GCUs can be arranged as a single block 112, multiple blocks, or any other suitable grouping of the array. Three exemplary GCUs are shown at 114, 116 and 118. (GCUs 1-3). Each GCU is managed as a unit for writing, reading and erasure operations. In some exemplary operations, read resolution of a GCU can be as small as a single page and can be tracked by metadata with page level granularity. The GCUs are allocated in turn to store data from a host. For example, GCU 1 may be allocated first and filled with stored data prior to allocation of GCU 2, and GCU 3 may be allocated once GCU 2 is filled. While the GCUs in FIG. 2 are shown to be of different size, in other embodiments all GCUs are of fixed size (e.g., n blocks 112). It is contemplated that new data will be written to the next available page location in the most recently allocated GCU. However, such new data writing operation is not limited and can be conducted on an optimal GCU selected from a number of active GCUs A selected LBA (LBA 0) is shown to have been successively stored in different locations of the array. A first version of LBA 0 is stored in GCU 1, a second, updated version is stored in GCU 2, and third and fourth updated versions are stored in GCU 3. Version 4 represents the current version of data and versions 1-3 represent stale data. While under some circumstances it may be appropriate to return an older version of data to the host (such as during a special archive retrieval event), under normal circumstances only the current version of data will be returned responsive to a host read request. Ideally, the metadata associated with the GCUs correctly identifies Version 4 as the most current version.

Figure 3:
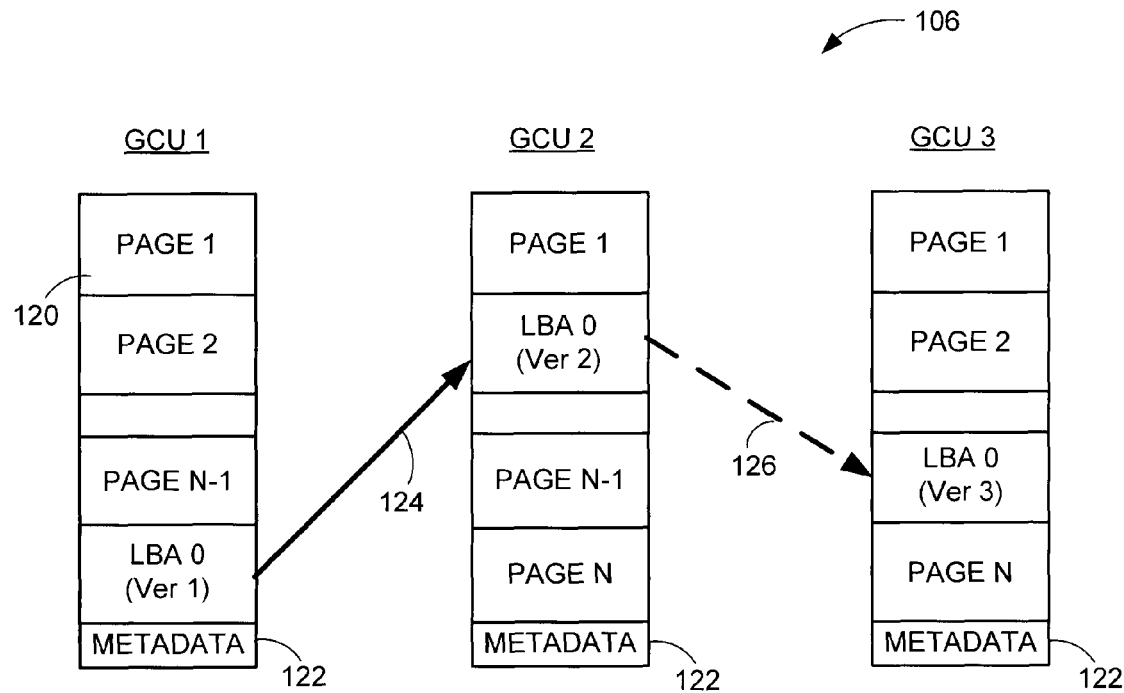
FIG. 3 illustrates the use of metadata stored in the GCUs to develop forward pointers to locate a current version of selected user data.

FIG. 3 shows three GCUs A, B and C. Each GCU includes N pages 120 for storing user data, and at least one metadata region 122 that stores metadata for the associated GCU. However, it should be noted that the metadata region is not limited to a page in the associated GCU and can be located in various other regions, such as a cache. The metadata ideally store all the necessary operational information to locate a physical location for a particular LBA in the associated GCU, but in a temporary relationship. That is, the association of the LBA and GCU are not permanently locked. Such metadata information can be used to locate various elements including firmware, defects, user data, and system information.

A number of metadata formats can be used. In some embodiments, the metadata include entries for each page 120 that identify the LBAs that are stored to that page. Since page mode operation is envisioned in which an entire page worth of data is output at a time, the system can use the metadata to read an associated page, and then locate a particular LBA therein from additional page level data that will be discussed below.

The metadata can be accessed from the array each time an LBA address of an associated GCU is accessed, or the metadata can be loaded to a volatile memory (such as the controller memory 102 in FIG. 1) during system initialization. Such exemplary operation can be referred to as logical-to-physical mapping where the associated GCU is not known until the metadata is queried.

Continuing with FIG. 3, a particular LBA (LBA 0) is shown to be stored in all three of the GCUs A-C. A first version of LBA 0 is stored in GCU A, a second version is stored in GCU B and a third, most current version is stored in GCU C. By scanning the metadata, the respective pages 120 storing each of these versions can be identified, and a chain of forward pointers 124, 126 can be generated that point to the most current version. If a metadata failure results in the inability to properly generate the second forward pointer 126, the system may incorrectly identify the second version in GCU B as the most current version, and may improperly return this data to the host.

Accordingly, various embodiments of the present invention append additional data management information to the system. This management information, referred to herein as descriptor data, operates to enable verification of the metadata from the metadata regions 122. The descriptor data also allows partial or complete reconstruction of the metadata in the event of system loss.

In exemplary embodiments, the descriptor data is provided in the form of headers at both the individual GCU level and at the individual page level. The descriptor data can be alternatively stored in and distributed among any number of other suitable locations depending on the requirements of a given application. In some cases, the descriptor data can advantageously reduce the required size of the metadata.

Figure 4:
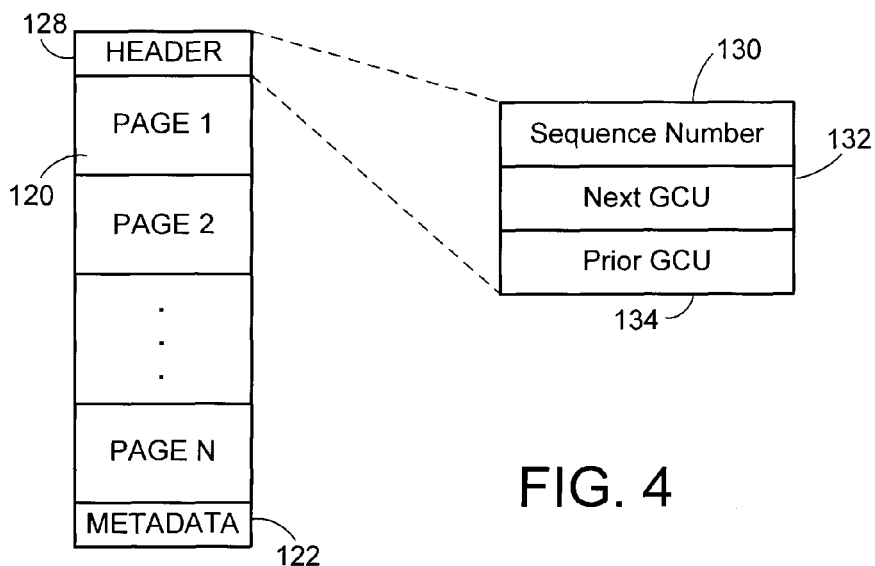
FIG. 4 provides an exemplary format for GCU descriptor data used in accordance with various embodiments to verify the operation of the metadata in FIG. 3.

GCU descriptor data are exemplified in FIG. 4. In at least some embodiments, the GCU descriptor data are generated for each GCU when the GCU is allocated for service. As shown in FIG. 4, a GCU header region 128 stores the GCU descriptor data in a sequence number field 130, a prior GCU pointer field 132, and a next GCU pointer field 134. The sequence number can be a time stamp or other serial number that identifies when the GCU was allocated and began being used to store data. The prior GCU pointer identifies the location (physical address) of the GCU allocated prior to the current GCU. The next GCU pointer identifies the location of the next GCU allocated after the current GCU, however, such pointers are not required and the next GCU can be indicated in a variety of different manners.

The GCU descriptor data can be referenced to identify the sequence in which currently active GCUs were allocated for the storage of user data. In the example of FIG. 4, the sequence number field can occupy 32 bits, and the prior GCU and next GCU fields can be provided as 16 bits for a total of 64 bits. These bits can occupy the first row of the GCU, with page 0 occupying the remainder of this row. Other suitable locations can be alternatively used, such as within metadata region 122. If multiple GCUs are concurrently available, the GCUs can be arranged into a ready queue and the sequence number will differentiate which GCU was utilized first. Each GCU remains active until filled with stored data, after which a next available GCU is allocated for use.

It will be noted that as each GCU is erased and placed into service, the time stamp data of field 130 and the physical address of the previous GCU of field 132 will be known, and so these values can be written to fields 130, 132 of the newly allocated GCU at this time. The address of the next GCU of field 134, however, may or may not be known at this time.

If the system uses an ordered queue of available GCUs, the next GCU in the queue can be identified as the next GCU and so field 134 can be filled when the current GCU is initially allocated. On the other hand, if GCUs are allocated on an as-needed basis, the next GCU may not be known until the current GCU is filled. Thus, upon allocation of a given GCU, the field 134 may remain blank and will not be filled in until the next GCU is actually allocated and placed into service.

Figure 5:
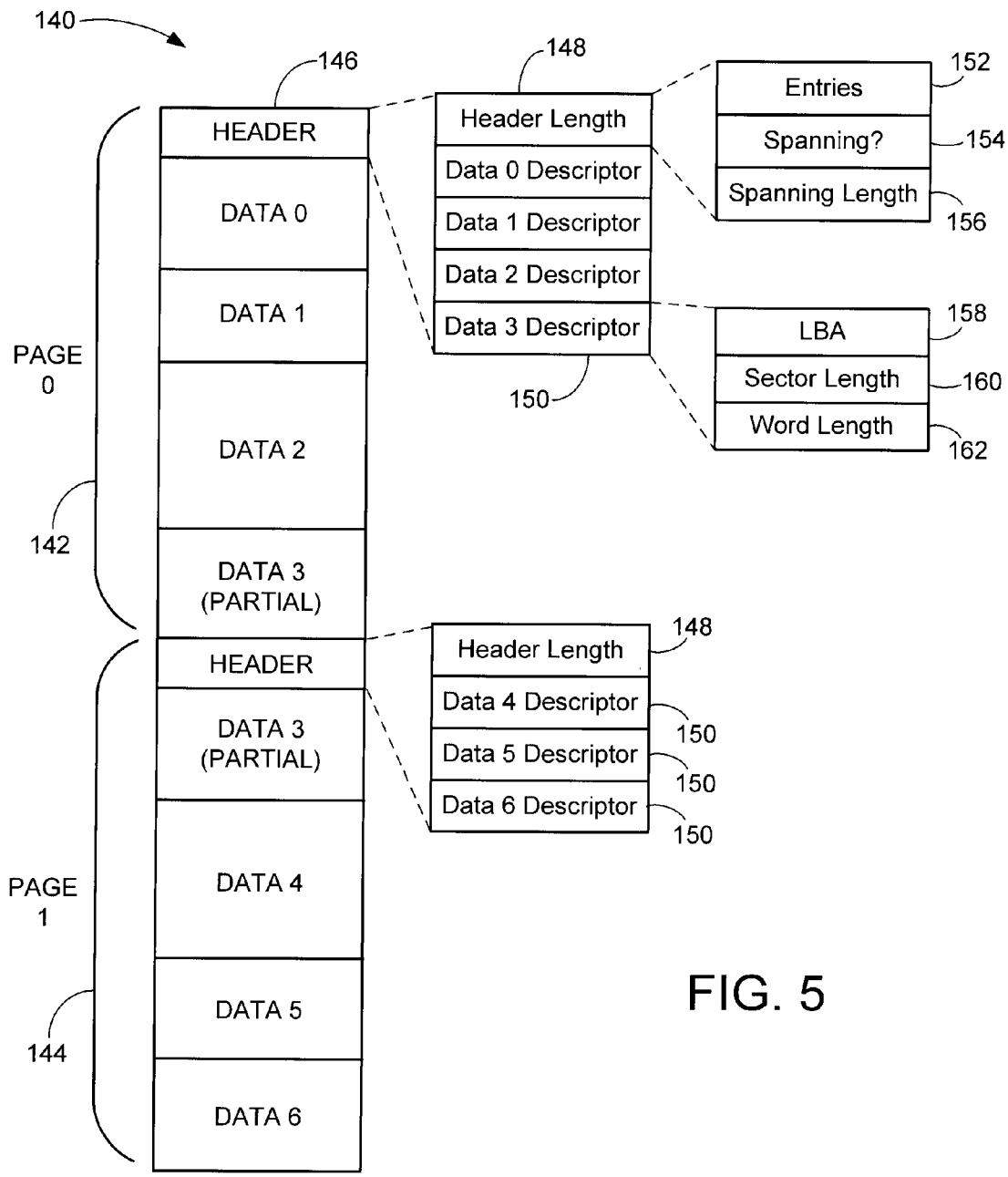
FIG. 5 shows an exemplary format for page descriptor data in accordance with various embodiments used in conjunction with the GCU descriptor data in FIG. 4.

Page level descriptor data are exemplified in FIG. 5. In at least some embodiments, the page descriptor data are appended to every physical page in the array, and serve to describe every LBA stored to that page. As shown in FIG. 5, a memory space 140 includes first and second pages 142, 144 (Page 0 and Page 1). Bits are allocated at the beginning of each page to establish a page header region 146. Each page header region 146 stores the page descriptor data for that page in a variety of fields including a header length descriptor 148 and a number of data descriptor fields 150.

The header length descriptor 148 identifies the total number of entries (e.g., LBAs) stored to the associated page in an entries field 152. A spanning field 154 indicates whether the last LBA spans the page boundary to the next page, as represented for DATA 3 in FIG. 5. A spanning length field 156 indicates the total number of spanned bits (or bytes) for the partial LBA (e.g., how much of the spanned LBA appear in the following page). In some embodiments, the entries field 152 uses seven (7) bits, the spanning field 154 uses one (1) bit, and the length field 156 uses ten (10) bits, for a total length of 18 bits. Other formats can be used.

Each of the individual data descriptor fields 150 are associated with at least an individual LBA stored to the associated page. It should be noted that the data descriptor fields 150 can also include object data, system data, and other metadata individually or in combination with the LBA. While formats can vary, the exemplary format in FIG. 5 includes an LBA identifier field 158 (32 bits) that uniquely identifies the associated LBA, a sector length field 160 (i.e. 3 bits) that indicates how many LBAs are stored to the associated page, and a word length field 162 (10 bits) that stores how many bytes (or alternatively, bits) the associated LBA occupies along the page, for a total of 45 bits. With reference to the second half of the spanned LBA 3 in FIG. 5, no duplicate entry is necessarily required in the header for the second page 144 since the information relating to this LBA is fully represented in the entry for this LBA in the first page 142.

It is contemplated that write data will be accumulated and written a page at a time, so that the page descriptor data can be generated and written during the writing of the associated LBAs. If less than a complete page of data is written, filler bits can be appended to fill the page, and the next write operation will commence with the next available page in the GCU.

The page header fields 146 (FIG. 5) provide information on every LBA at the page level, and the GCU header fields 128 (FIG. 3) provide information with regard to the order in which the GCUs were written. If two or more versions of the same LBA are present in a GCU, a version of the LBA at a higher (later in time) page address of the GCU supersedes the version of the LBA at a lower (earlier in time) page address.

Thus, these elements can be combined to verify any sequence of forward pointers in the metadata.

Figure 6:
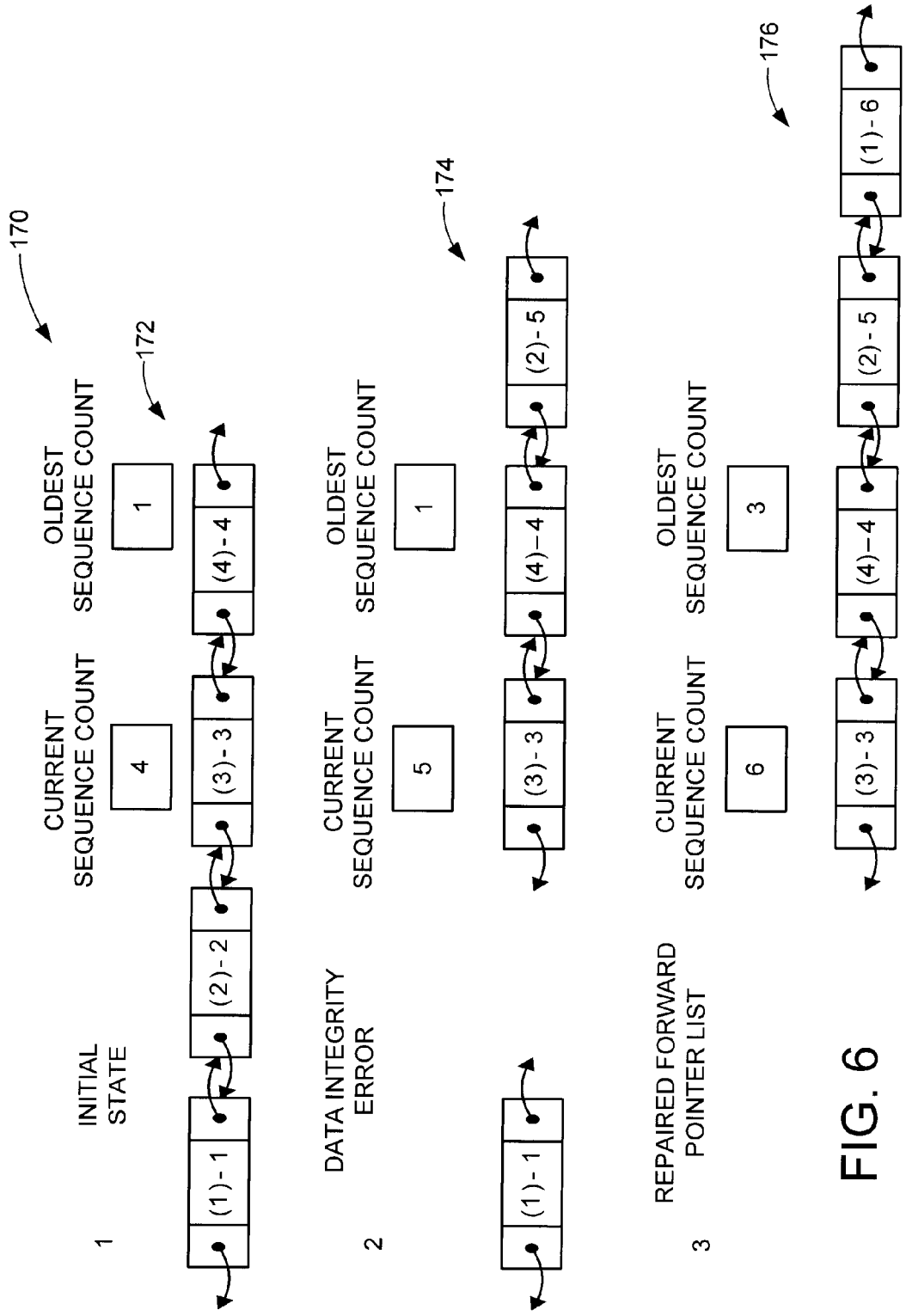
FIG. 6 provides a number of different GCU sequence states over time during operation of the device of FIG. 1.

To illustrate this operation, an exemplary sequence structure 170 is shown in FIG. 6. An initial state 1 is denoted at 172. In this initial state, a total of four GCUs have been allocated, denoted as GCUs 1, 2, 3 and 4. For reference, GCU identifiers are shown in parentheses, followed by a number indicating relative order of allocation. Since the GCUs in state 1 were allocated in order, these respective numbers happen to match.

This provides a continuous, unbroken chain of all GCUs in the system, with GCU 1 being the oldest in the chain and GCU 4 being the most recently allocated GCU in the chain. The forward pointers of the metadata can be verified by reference to the GCU and page descriptor data, which should nominally be present for all of the GCUs in the chain.

A subsequent state 2 of the system is denoted at 174. In this state, all of the data in GCU 2 were previously determined to be stale, and so GCU 2 was erased and has now been allocated as the fifth GCU in the sequence. The current GCU is GCU 2, and the oldest active GCU remains GCU 1. The chain of GCUs is broken by the hole provided by the erasure and reallocation of GCU 2, and metadata pointers previously stored in GCU 2 have been lost.

A subsequent state 3 is denoted at 176. In this state, all of the data in GCU 1 were previously determined to be stale, so GCU 1 was erased and reallocated as the sixth GCU in the sequence. GCU 1 is now the current GCU and GCU (3) is the oldest GCU. This provides a continuous chain but all metadata previously stored in GCUs (1) and (2) are now lost.

Figure 7:
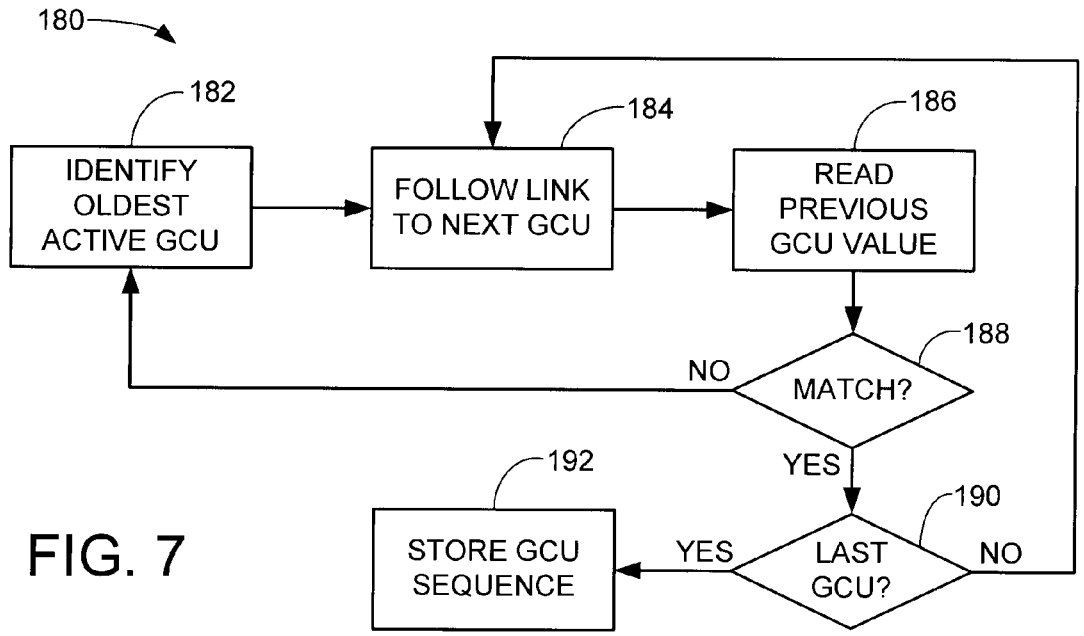
FIG. 7 is a logic routine used to establish a GCU sequence list indicative of the current order of GCU allocation.

FIG. 7 shows exemplary logic 180 that can be used to determine the GCU sequence list at any given point in time. The logic 180 can comprise programming steps stored in a memory location accessible by the system controller. Alternatively, the logic 180 can be realized in specially configured hardware. It is contemplated that the system will perform this operation at suitable times, such as after each new GCU is allocated for service. A current, updated copy of the GCU sequence list will be stored for future reference.

The logic 180 begins in FIG. 7 at step 182 with a search for the oldest active GCU. This can be carried out by examining the serial number value of the GCU header field 130 in each GCU. The GCU with the oldest date is identified. This oldest active GCU is identified as the first GCU in the sequence. At step 184, the next GCU field 132 of the first GCU is read to identify the address of a second GCU that was allocated immediately after the first GCU. At step 186, the previous GCU field 132 of the second GCU is read.

A comparison is made at step 188 to determine if the previous GCU field 132 of the second GCU identifies the address of the first GCU. If so, a continuous sequence is detected as in state 1 of FIG. 6 between GCUs (1) and (2). If not, a hole in the sequence is detected as in state 2 of FIG. 6.

If a hole is detected, the logic returns to step 182 and the next oldest GCU is identified, such as GCU (3) in state 2 of FIG. 6. This next oldest GCU is characterized as the new first GCU in the sequence, and the process continues as discussed above. If no hole is detected, a determination is made at decision step 190 as to whether all of the active GCUs have been accounted for in the sequence.

If not, the logic 180 passes back to step 184 and the links continue to be followed as before. If the end of the chain has been identified, the logic passes from step 190 to step 192, where the updated GCU sequence list is stored in local memory.

Figure 8:
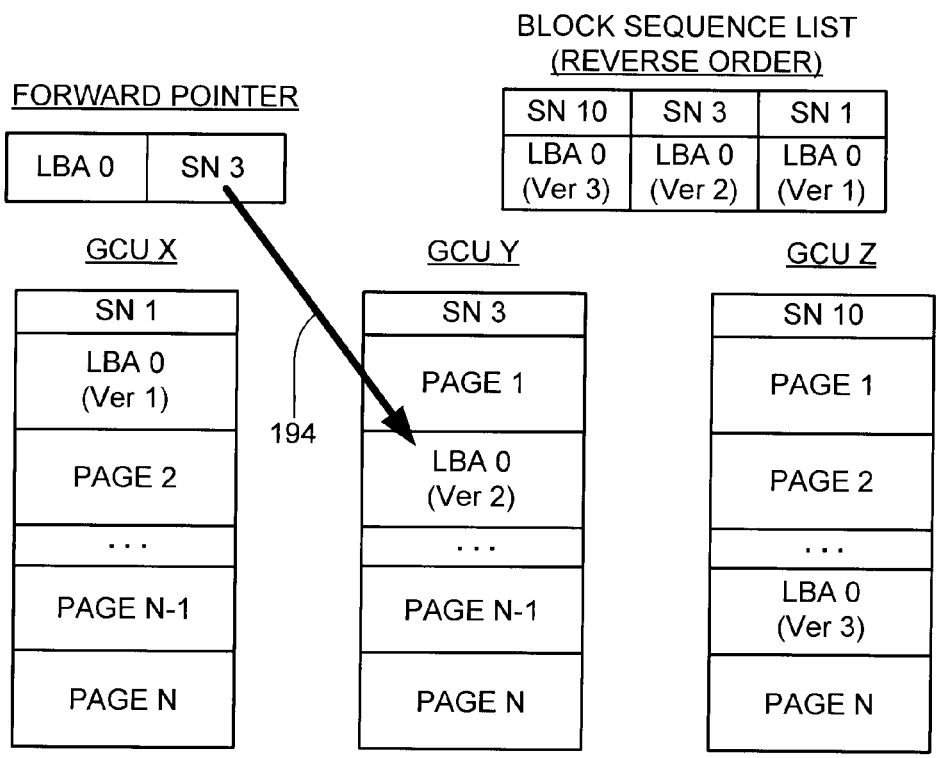
FIG. 8 illustrates use of a reverse search to verify the metadata using the GCU sequence list generated by FIG. 7.

The GCU sequence list is used to verify the metadata as shown in FIG. 8. GCUs X, Y and Z have associated sequence numbers (SNs) of 1, 3 and 10. GCU X is thus the oldest active GCU in the sequence and GCU Z is the most currently allocated GCU in the sequence. Three different versions of a selected LBA (LBA 0) are stored in each of the GCUs as shown. The metadata fails to identify the most current version of LBA 0 in GCU Z, and instead provides a forward pointer 194 to the second version of LBA in GCU Y. Thus, according to the metadata, Version 2 is the current data for LBA 0.

To verify the metadata, the GCU sequence list is referenced to determine whether any GCUs have been allocated after the GCU pointed to by the metadata. In the example of FIG. 8, GCU Z would be identified as having been allocated after GCU Y. A reverse scan of GCU Z is thus commenced in an effort to locate any copies of LBA 0. In some embodiments, the pages in the GCU are sequentially read in reverse order, beginning with the oldest filled page, and the descriptor data in each page are scanned in an effort to locate LBA 0 in the LBA fields 158 on each page. If a match is found, the associated data for LBA 0 in that page is located and output.

Since pages are filled in sequential order that may be based on a fixed, mathematical, or table look-up determination, the first copy of the LBA located during this reverse search will be the most current version of the data. The metadata will be correct if the reverse search locates the LBA at the same page as indicated by the metadata. If not, the metadata is incorrect and will be marked for rebuild.

When multiple GCUs are found to have been allocated beyond the GCU identified by the last forward pointer, each of these subsequent GCU may be scanned in turn beginning with the most recent GCU until the first version of the LBA is located. If none of these subsequent GCUs are found to store a version of the LBA, the GCU identified by the metadata as storing the most recent copy (GCU Y in FIG. 8) is reverse scanned to determine whether an updated copy is in the GCU. This will detect whether there is a newer version of LBA 0 in GCU Y. If the reverse search sequence provides the same result as the metadata, the metadata is confirmed as being correct.

The efficiency of the reverse searching operation can be improved by storing at least some of the descriptor data in a table in separate memory, such as local controller DRAM or a content addressable memory (CAM). In this way, the reverse searching operation can be applied to the table rather than physically searching each of the GCUs.

An exemplary LBA registry table 200 is shown in FIG. 9. For each LBA in the system, the previous sequence number and previous physical address of the GCU are stored in the table based on LBA. The index for the table does not necessarily have to be by single LBA, but could be multiple LBAs such as the LBAs stored along a selected page (or multiple pages). Such grouping of LBAs would serve to reduce the size of the table.

The table can be maintained independently of the metadata, and only a subset of previous sequence numbers for each LBA may be stored. The list of previous sequence numbers can be any length, but a length of 1 is shown in FIG. 9, and this is sufficient to assure temporal data integrity of the metadata.

When a new version of the LBA is written to the array, the sequence number for the previous GCU where the LBA was previously written can be recorded in the table 200. If the sequence number from the current GCU read is the same as the previous sequence number, a search for multiple newer copies of the LBA within that GCU can be performed. If there are multiple copies of the LBA within the current GCU, then there is not a temporal data integrity failure. If there are not multiple copies of the LBA within the current GCU, then there is a temporal data integrity failure for the previous write. This can then trigger a rebuild of the metadata.

FIG. 10 shows the table 200 of FIG. 9 populated with data for a selected number of LBAs. The table can be created and continuously updated as data are written to the memory array. In various embodiments, the LBA registry 210 is present as a separate portion of memory, such as a cache or CAM that logs entries from top to bottom or from beginning of a page of flash memory to the end of a page of flash memory as data is stored in the memory. With the LBA registry being chronologically sorted due to being created and updated while data are written, all the occurrences of a particular LBA from the LBA registry can be extracted in a reverse order. The result is that all the same LBAs are sorted so that the most recently written version is in the first entry of the sequence list.

In other embodiments, an LBA directory can be created such as shown at 210 in FIG. 11 while data are stored to various locations in a memory array. The LBA directory can be configured to list all the occurrences of a particular LBA for a certain block sequence count. The LBA directory can be created in the place of, or in conjunction with, the LBA registry to provide efficient identification and retrieval of the most recent version of a particular LBA.

A bitmask scheme can further be employed to aid in the metadata verification. The bitmask is used to mark LBAs within a selected page or GCU as stale. The bitmask can be at the individual LBA level, or at the page level so that a single indicator is used for all of the LBAs stored to a given page, or even to multiple pages. An exemplary valid bitmask table is shown at 220 in FIG. 12. The bitmask table can be stored in a portion of the non-volatile array, and loaded to local volatile memory during system initialization. Updates can be made to the table in local volatile memory, so long as provision is made to write the table back to non-volatile memory upon system power down.

When an LBA is written to a physical location in the array, an associated valid bit 222 in the table 220 is set to an appropriate logical value, such as logical 1, to indicate that this version is now the most current version of the data for that LBA. The previous physical location that contained the LBA will have its associated valid bit changed to a different logical value, such as logical 0, indicating that this version is now stale. The previous physical location will be known because this location will be stored in the system metadata tables. This previous physical location will be used to index into the valid bitmask table so that the valid bit can be cleared to 0.

If each bit represents multiple logical elements (such as one or more bits of data present in at least one page of data), the bit can be cleared to 0 whenever just a single one of the LBAs in the group is rendered stale, or the bit can remain at 1 until all of the LBAs in the group are rendered stale. Secondary entries can be generated as needed to identify the status of the individual LBAs when some are current and some are stale. This can reduce memory requirements.

The valid bitmask table 220 can be used to determine if the current location of an LBA is the most recent version because only the most recent copy will have the valid bitmask set to 1. During a read request, the physical location stored in the metadata will be read. This physical address will be used as the look-up address to the valid bitmask table. An LBA offset 224 may be stored in a table, or can be determined from the embedded metadata. If the valid bit for the requested LBA offset if cleared to zero then there is a metadata failure and an error can be reported to the host or a metadata rebuild operation can be triggered.

Figure 13:
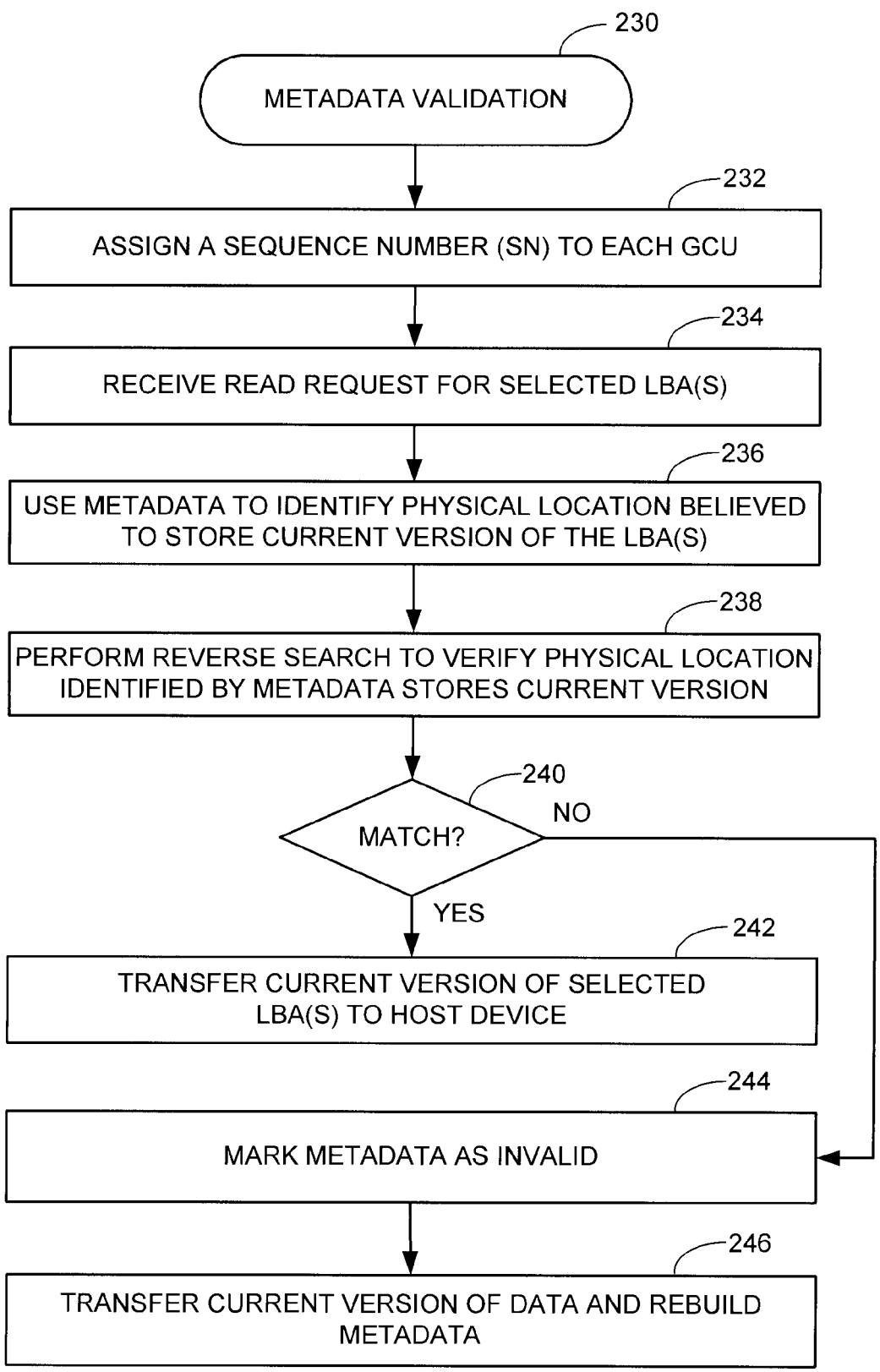
FIG. 13 sets forth a METADATA VALIDATION routine illustrative of steps carried out in accordance with various embodiments.

FIG. 13 provides a flow chart for a METADATA VALIDATION routine 230 in accordance with various embodiments of the present invention. The routine begins at step 232 by assigning a sequence number (SN) to each GCU in a memory array to denote the order in which the GCUs are allocated for service. The SN may take a form as discussed above for SN field 130 in FIG. 4. Next GCU and previous GCU addresses may also be stored at this time, as provided in fields 132, 134 in FIG. 4. Each GCU is allocated in turn as required during system operation to provide memory space to accommodate the storage of user data. Each newly allocated GCU is filled with data in a selected order, such as beginning with page 0 and incrementally continuing to page N.

A read request for one or more selected LBAs is received at step 234. The system operates to consult metadata to identify a physical location that stores the most current version of said LBA(s), step 236. The physical location may be a selected page in a selected GCU.

A metadata verification operation is carried out at step 238 that involves a reverse search of data stored in one or more GCUs. This reverse search may be carried out in a number of ways as discussed above. The search may include generating a GCU sequence list, identifying any GCUs that were placed into service after the GCU pointed to by the metadata in step 236, and searching the contents of these newer GCUs for one or more versions of the requested LBA(s). The GCU pointed to by the metadata may also be subjected to reverse searching to determine whether a newer version exists in that GCU.

During this searching, the first located copy of the LBA will be determined to be the most current version. The reverse searching may be carried out by reading the GCUs and scanning page level descriptor data as discussed in FIG. 8, by searching separate tables of the descriptor data in separate memory as in FIGS. 9-11, and/or by consulting a bitmask as discussed in FIG. 12.

Decision step 240 determines whether there is a match in physical location between the metadata and the reverse search operation. If so, the metadata are determined to be accurate and the data from the physical location is returned to the host at step 242. Otherwise, the metadata are marked invalid at step 244, the data are returned from the location identified by the descriptor data and, as desired, the metadata are rebuilt based on the descriptor data at step 246. For example, a new metadata entry may be appended to identify the most current version of the data in the associated GCU.

As can be appreciated by one skilled in the art, the various embodiments illustrated herein can provide beneficial memory utilization and data retrieval. The use of reverse searching a compile list of LBAs that is sorted in reverse chronological order allows for efficient verification of a forward pointer system. Moreover, the most recent version of data can be reliably outputted to a host despite undetected errors in identifying data updates. It will be appreciated that the various embodiments discussed herein have numerous potential applications and are not limited to a certain field of electronic media or type of data storage devices.

For purposes herein, the references to rows and columns will be read broadly as relational identifiers in an ordered array of elements along different axes without constituting a specific physical layout. Thus for example, the term "row" may constitute a physical column without deterring from the scope of the claimed invention.

It is to be understood that even though numerous characteristics and advantages of various embodiments of the present invention have been set forth in the foregoing description, together with details of the structure and function of various embodiments of the invention, this detailed description is illustrative only, and changes may be made in detail, especially in matters of structure and arrangements of parts within the principles of the present invention to the full extent indicated by the broad general meaning of the terms in which the appended claims are expressed.

What is claimed is:

1. A method comprising:
   locating a physical address within a data storage space identified by metadata as storing a current version of user data with a selected logical address; and
   determining the located physical address stores a stale version of the user data with the selected logical address by performing a reverse search of a table in a memory that associates garbage collection units (GCUs) of the data storage space with logical addresses of user data stored therein, the first identified entry in the table having the associated logical address constituting the current version of the user data.

2. The method of claim 1, wherein the determining step comprises locating a second physical address that stores a newer version of the user data written after the stale version of the data were mitten to the physical address identified by the metadata, and marking the metadata as invalid.

3. The method of claim 1, further comprising locating the physical address identified by the metadata in a first selected GCU, and performing the reverse search on the table to find the data identified by logical address in a second selected GCU.

4. The method of claim 3, wherein the physical address identified by the metadata comprises a first page of the first selected GCU, and wherein the reverse search identifies a second page of the second selected GCU different from and written after the first page, wherein the first page stores the stale version of the user data, and wherein the second page stores the current version of the user data.

5. The method of claim 4, wherein the first selected GCU is the same GCU as the second selected GCU.

6. The method of claim 1, further comprising:
   generating a sequence list indicative of an order in which the GCUs were allocated for service;
   locating the physical address in a first selected GCU; and
   using the sequence list to perform a reverse search of a second selected GCU placed into service after the first selected GCU.

7. The method of claim 6, wherein descriptor data are generated for each GCU, the descriptor data comprising a sequence number indicating when the associated GCU was allocated for service relative to the remaining GCUs, a previous GCU value which identifies a physical address of the GCU that was allocated for service immediately prior to the associated GCU, and a next GCU value which identifies a physical address of the GCU that was allocated for service immediately after the associated GCU.

8. The method of claim 7, wherein the descriptor data further comprise page level descriptor data comprising data appended to each page in each GCU, the page level descriptor identifying the logical addresses of the user data stored to each said page.

9. The method of claim 8, wherein the sequence list is generated by using the descriptor data to identify an oldest active GCU among the GCUs, and following forward and backward links in the descriptor data to identify the sequence in which the GCUs were successively allocated for service.

10. The method of claim 1, further comprising generating a bitmask of bits that respectively represent each copy of user data stored in the memory space by logical address with a first logical value in the bitmask indicating a most current version of data having a selected logical address and a different, second logical value in the bitmask indicates a stale version of data having the selected logical address, and wherein the determining step further comprises evaluating the bit in the bitmask for the physical location identified by the metadata to determine whether said bit is set at the first or second logical value.

11. A solid-state memory device comprising:
a solid-state memory space having first and second portions; and
a controller which locates a physical address within the first portion identified by metadata associated with the first portion as storing a current version of user data with a selected logical address, and which performs a reverse search of a second portion of the memory space to determine whether the physical address identified by the metadata stores a stale version of the user data with the selected logical address using a table in a memory that associates each logical address with a selected garbage collection unit (GCU) of the memory space to which data associated with said logical address are stored, the first identified entry in the table having the associated logical address constituting the current version of the user data.

12. The memory device of claim 11, characterized as a solid state drive (SSD) with the memory space characterized as non-volatile memory.

13. The memory device of claim 11, wherein the memory space is arranged as a plurality of garbage collection units (GCUs) each comprising at least one erasure block adapted to store user data identified by logical addresses, and wherein the controller locates the physical address identified by the metadata in a first selected GCU and performs the reverse search on data associated with a second selected GCU.

14. The memory device of claim 13, wherein the controller stores descriptor data in each GCU comprising a sequence number indicative of when the associated GCU was allocated for service relative to the remaining GCUs of said plurality, generates a GCU sequence list indicative of the order in which the GCUs were successively allocated for service, and performs the reverse search on the second selected GCU as identified by the GCU sequence list as having been allocated for service after allocation of the first selected GCU.

15. The memory device of claim 14, wherein the sequence list is generated by using the descriptor data to identify an oldest active GCU among said plurality of GCUs, and following forward and backward links in the descriptor data to identify the sequence in which the GCUs were successively allocated for service.

16. The memory device of claim 13, wherein the physical address identified by the metadata comprises a first page of the first selected GCU, and wherein the reverse search by the controller identifies a second page of the second selected GCU different from and written after the first page, wherein the first page stores the stale version of the user data, and wherein the second page stores the current version of the requested data.

17. The memory device of claim 11, wherein the controller further generates a bitmask in the memory space with bits that represent each copy of user data stored in the memory space by logical address with a first logical value in the bitmask indicating a most current version of data having a selected logical address and a different, second logical value in the bitmask indicates a stale version of data having the selected logical address, and wherein the performing step further comprises evaluating the bit in the bitmask for the physical location identified by the metadata to determine whether said bit is set at the first or second logical value.

18. A solid-state memory device comprising:
a solid-state memory space arranged into a plurality of garbage collection units (GCUs) each adapted to store user data identified by logical addresses, the memory space further storing metadata that identifies a correspondence between physical addresses and logical addresses of the stored user data; and
a controller adapted to reference the metadata to identify a first physical address indicated by the metadata as storing a current version of selected data having an associated logical address, and to verify the metadata by referencing a table in a memory that associates logical addresses with the GCUs to which data associated with said logical addresses are stored, the first identified entry in the table having the associated logical address constituting the current version of the selected data, the physical address identified by a first page of a first selected GCU, and the first identified entry identifying to second page of a second selected GCU different from and written after the first page, the first page storing a stale version of the user data and the second page storing the current version of the user data.

19. The solid-state memory device of claim 18, in which the GCUs each have a sequence number that indicates an order in which each GCU was successively allocated for service, and in which the controller further uses the uses the sequence numbers of the GCUs to verify the metadata.

* * * * *